J. A. GALVIN.
TRACTOR WHEEL.
APPLICATION FILED MAR. 14, 1918.
1,276,515.
Patented Aug. 20, 1918.
2 SHEETS—SHEET 1.
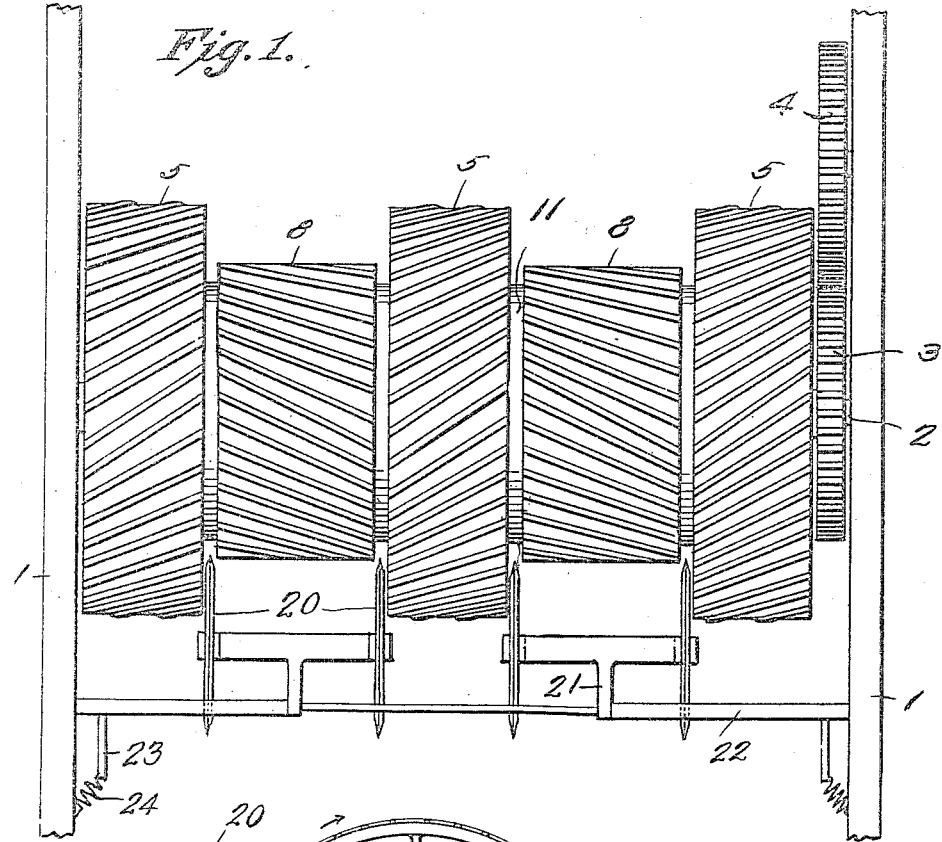
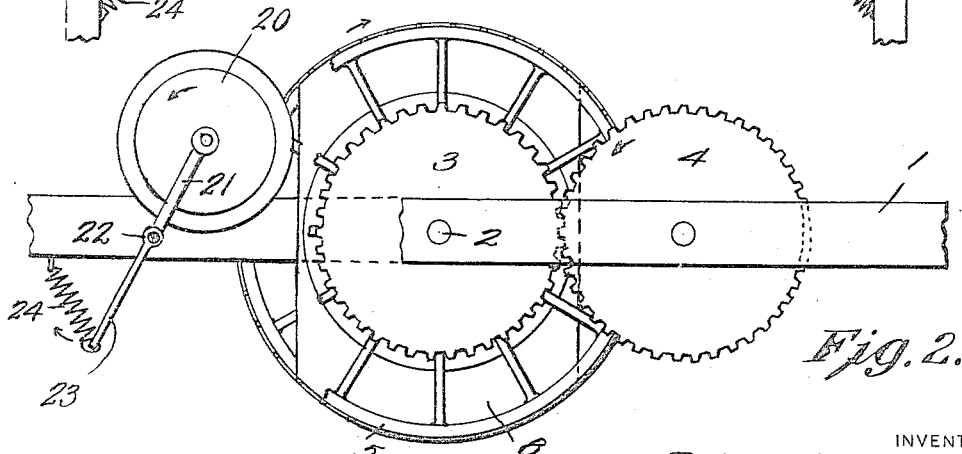
INVENTOR
John A. Galvin,
WITNESSES
BY
ATTORNEY J. A. GALVIN.
TRACTOR WHEEL.
APPLICATION FILED MAR. 14, 1918.
1,276,515.
Patented Aug. 20, 1918.
2 SHEETS—SHEET 2.
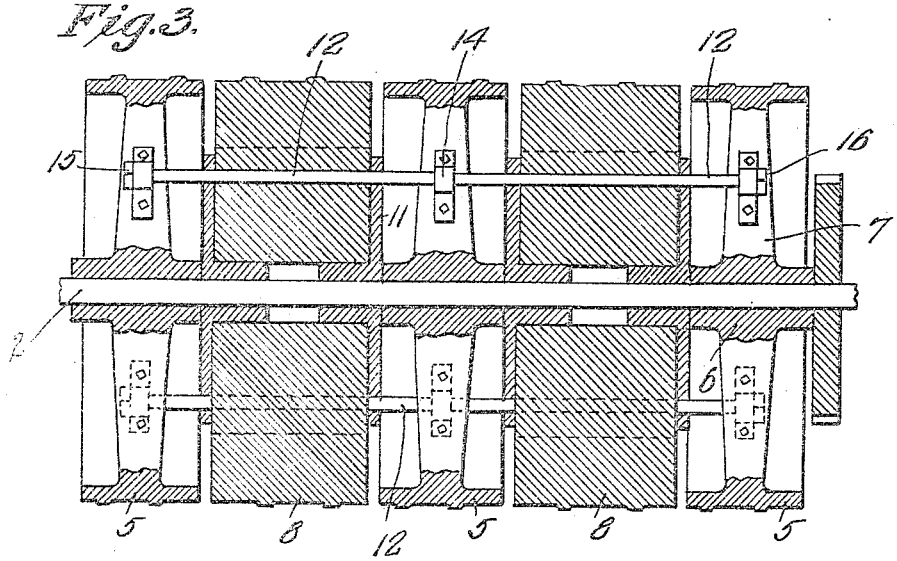
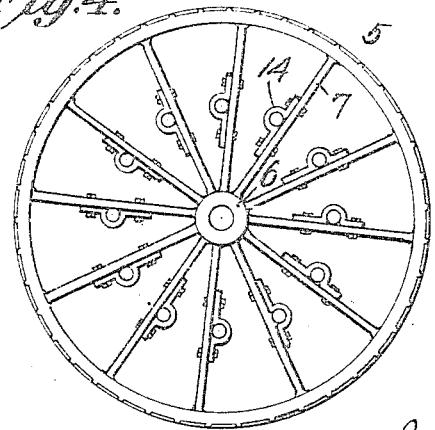
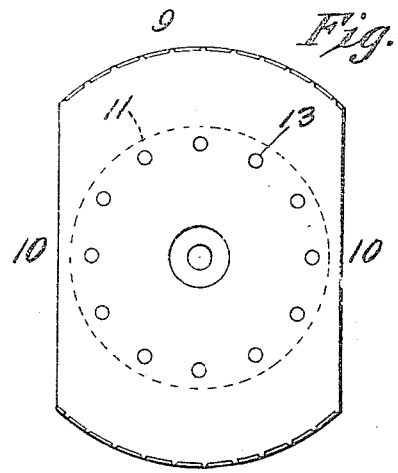
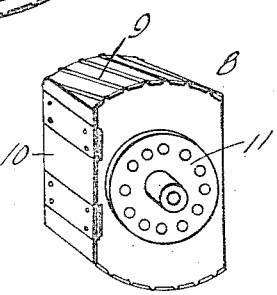
WITNESSES
INVENTOR
John A. Galvin,
BY
ATTORNEY

UNITED STATES PATENT OFFICE.

JOHN A. GALVIN, OF SPALDING, NEBRASKA.

TRACTOR-WHEEL.

1,276,515.     Specification of Letters Patent.     Patented Aug. 20, 1918.

Application filed March 14, 1918. Serial No. 222,446.

*To all whom it may concern:*

Be it known that I, JOHN A. GALVIN, a citizen of the United States, residing at Spalding, in the county of Greeley and State of Nebraska, have invented certain new and useful Improvements in Tractor-Wheels, of which the following is a specification.

This invention relates to tractors, and more especially to the drive wheels thereof; and the primary object of the same is to produce improved means for keeping the wheels free of mud, stone, and other obstructions which accumulate upon them, and which must now be removed by hand to prevent the tractor wheel from slipping. Another object is to build up a composite tractor wheel of a number of units or elements which are detachable and replaceable when they become broken or injured, which makes the wheel lighter as a whole, which gives a better grip on the surface than a narrower wheel would afford, and which provides channels into which may enter disks for cutting and cleaning off the accumulation. Details will be set forth below, and reference is made to the drawings, wherein:—

Figure 1 is a plan view of this tractor wheel in one of its forms, and of the mechanism for driving it, Fig. 2 is a side elevation of the same, Fig. 3 is a longitudinal section through a part of said wheel, Fig. 4 is a detail of what I call the whole wheel unit, and Fig. 5 a detail of what I call a segmental unit.

Fig. 6 is a perspective detail of one segmental unit.

In frame bars 1 is mounted a shaft 2 carrying the several units hereinafter described, and also, as shown in Figs. 1 and 2 carrying a driven gear 3 meshing with a driving or power gear 4, which latter may be driven by any suitable motor on the frame, not shown and not necessary to describe in this specification. The power thus communicated to the main shaft is intended to drive the machine over the ground by the grip of the tractor wheel with the surface thereof. This I effect by building my wheel in an improved manner. As seen in Fig. 1 it is made up of five elements or units, the first, third, and fifth of which are whole wheel units 5 as seen in Fig. 4, each preferably having a hub 6 mounted fast on the shaft 2, spokes 7 radiating from said hub, and a rim which is roughened on its outer periphery so as to make good grip on the earth. The tractor wheel as a whole also includes two segmental units 8 interposed between the whole wheel units as seen in Fig. 1. Each segmental unit is of the contour best illustrated in Fig. 5. That is to say, at two opposite sides 9 it is curved on its periphery to follow the curvature of the periphery of the whole wheel unit, and at its two remaining sides it is cut off on a chord 10, and on lines which are straight or otherwise as preferred. The composite tractor wheel further includes four washers 11 interposed between the other elements and having hubs 11' strung on the shaft and extending into cavities at the centers of the units 8 as seen in Fig. 3. The washers are somewhat smaller in size than the shortest diameter of the segmental unit, as indicated by the dotted circle 11 in Fig. 5, and therefore the edge of the washer at no point comes even opposite the chord line 10. While any suitable means may be employed for fastening the several elements together into a composite whole, I preferably pass rods or bars 12 through holes 13 in the segmental units and in the washers, and through elements 14 bolted or clipped to the spokes 7 of the whole wheel units, as seen in Fig. 4. These bars in Fig. 3 are illustrated in the form of bolts, each having a nut 15 at one end and a head or another nut 16 at the other end, and if so they may be tightened up to hold the parts thus assembled. Although I have shown the two segmental units 8—8 of Fig. 1 as standing in strict parallelism with each other, it is obvious that they could be set on the shaft in different positions. Also it is obvious that there might be a greater or lesser number of the several units than illustrated. If a very wide tractor wheel were desired, there might be seven or even nine of the whole wheel units, with segmental units interposed, and the latter might be arranged at right angles to each other or at various angles to each other throughout the series. The long bars or bolts 12 would extend through the whole of the entire series and be attached to the spokes of all the whole wheel units, which spokes I employ to make these units lighter.

For cleaning the mud, dirt, and other accumulations from between the units, I make use of a number of disks 20, mounted individually or in pairs on supports 21 which in turn are mounted radially on rock shafts 22 journaled in the frame, and each shaft has a crank arm 23 moved normally by a spring 24 in a direction to throw the disks toward the main axle and cause their edges to cut through the accumulations, especially when the flat or chord sides of the segmental units come opposite the disks, and the accumulations will thus fall out before the tractor wheel makes another revolution. The ribs on the peripheries of the several units may take any shape desired, although in Fig. 1 I have shown them inclined and continuous from edge to edge.

What is claimed as new is:—

1. The herein described composite tractor wheel made up of a series of whole wheel units, a series of segmental units interposed between the others and each having a cavity at its axis, washers interposed between the units and each having a hub extending into the cavity of one of the segmental units, means for connecting all units with each other, and a single shaft passing through the centers of the whole wheel units and the hubs of the washers.

2. The herein described composite tractor wheel made up of a series of whole wheel units each having a hub and spokes and a rim, a series of segmental units interposed between the others and each having a cavity at its axis and holes around the same, washers between the units having hubs passing into said cavities, a shaft extending axially through all units and fitting closely in all hubs, and a series of bolts passing through all units and washers for holding the parts together.

3. The combination with a tractor wheel made up of a series of units whereof alternate ones are cylindrical and those interposed are of other than cylindrical shape, spacing washers interposed between and smaller than said units, a shaft on which all the units and washers are strung, and means for locking the parts together; of cleaning devices, and means for projecting them into the spaces opposite said washers.

4. In a tractor wheel of the type described, the combination with a series of units mounted on a shaft, and a series of washers also mounted on the shaft between the units; of disks respectively opposite the washers, and movable supports for the disks whereby they may be projected into the spaces between the units and toward the washers, for the purpose set forth.

5. In a tractor wheel of the type described, the combination with a series of whole wheel units, a series of segmental units interposed between them, washers between all units, and a shaft on which all these elements are mounted; of a set of disks standing respectively opposite the washers, movable supports carrying said disks, and means for swinging the supports and moving the disks toward and into contact with the washers, for the purpose set forth.

In testimony whereof I affix my signature in presence of two witnesses.

JOHN A. GALVIN.

Witnesses:
JOHN P. DUNNING,
HUGH MORSE.